United States Patent [19]

Chung

[11] Patent Number: 5,718,308
[45] Date of Patent: Feb. 17, 1998

[54] AUTOMATIC BRAKE-ADJUSTING DEVICE

[76] Inventor: Chiang-Hai Chung, No. 9-4, Ch'ung-Li St., Chi-Tu, Keelung, Taiwan

[21] Appl. No.: 594,668

[22] Filed: Feb. 2, 1996

[51] Int. Cl.⁶ .................................................. F16D 65/52
[52] U.S. Cl. ............... 188/79.51; 188/71.8; 188/79.54; 188/79.56; 188/196 BA; 188/72.7
[58] Field of Search ................ 188/79.55, 196 BA, 188/71.8, 71.9, 79.51, 72.8, 72.7, 30, 31, 82.1, 71.2, 71.3, 1.11, 72.6, 72.1, 72.9, 72.2, 329, 330, 332, 338, 339, 79.54, 79.56, 79.57–79.64, 82.2, 82.3, 82.34, 82.7, 106 A

[56] References Cited

U.S. PATENT DOCUMENTS

| | | | |
|---|---|---|---|
| 2,194,586 | 3/1940 | Boldt | 188/196 BA |
| 2,648,996 | 8/1953 | MacDougall | 188/196 BA |
| 2,650,681 | 9/1953 | Shively | 188/196 BA |
| 3,155,195 | 11/1964 | Brawerman | 188/196 BA |
| 3,517,783 | 6/1970 | Belart | 188/196 BA |
| 3,618,715 | 11/1971 | Bostwick | 188/79.55 |
| 3,776,329 | 12/1973 | Hope et al. | 188/1.11 WE |
| 3,926,284 | 12/1975 | Notario | 188/79.55 |
| 4,150,735 | 4/1979 | Acre et al. | 188/196 BA |
| 4,180,146 | 12/1979 | Airheart | 188/196 BA |
| 4,380,276 | 4/1983 | Sweet et al. | 188/196 BA |
| 4,394,892 | 7/1983 | Mizwawa et al. | 188/329 |
| 4,399,896 | 8/1983 | Tribe | 188/71.9 |
| 4,494,633 | 1/1985 | Idesawa | 188/330 |
| 4,727,963 | 3/1988 | Villata | 188/71.9 |
| 5,036,958 | 8/1991 | Yamamoto | 188/79.55 |
| 5,184,701 | 2/1993 | Mamery | 188/79.55 |
| 5,394,767 | 3/1995 | Hoblingre et al. | 188/72.7 |

FOREIGN PATENT DOCUMENTS

| | | | |
|---|---|---|---|
| 687984 | 6/1964 | Canada | 188/79.55 |

*Primary Examiner*—Douglas C. Butler
*Attorney, Agent, or Firm*—W. Wayne Liauh

[57] ABSTRACT

An automatic brake-adjusting device, and particularly an automatic brake-adjusting device to be used in a trailer, and the device comprises an outer case, a ratchet, a pawl, a pulling bar, a transmission device and an outer lid; the ratchet includes a plurality of first ratchet teeth; the pawl has at least a second ratchet tooth to be engaged with the first ratchet teeth so as to have the ratchet turn in one direction freely. The rotation of the ratchet enables the brake shoe to provide a braking function. When the pulling bar is driven with the brake pneumatic cylinder in a braking direction, the ratchet will be turned slightly in the free rotation direction so as to enable the brake shoe to provide a braking function. As soon as the driving force to the brake pneumatic cylinder is removed, the ratchet will turn backwards slightly to release the braking function. When the brake shoe is worn out to a given condition, the pulling bar will have the ratchet move at a tooth pitch in the free rotation direction so as to have the brake shoe restored to the original brake clearance.

5 Claims, 8 Drawing Sheets

AUTOMATIC BRAKE-ADJUSTING DEVICE

FIELD OF THE INVENTION

This intention relates to an automatic brake-adjusting device, and particularly to an automatic brake-adjusting device to be used in a

BACKGROUND OF THE INVENTION

Figure 1:
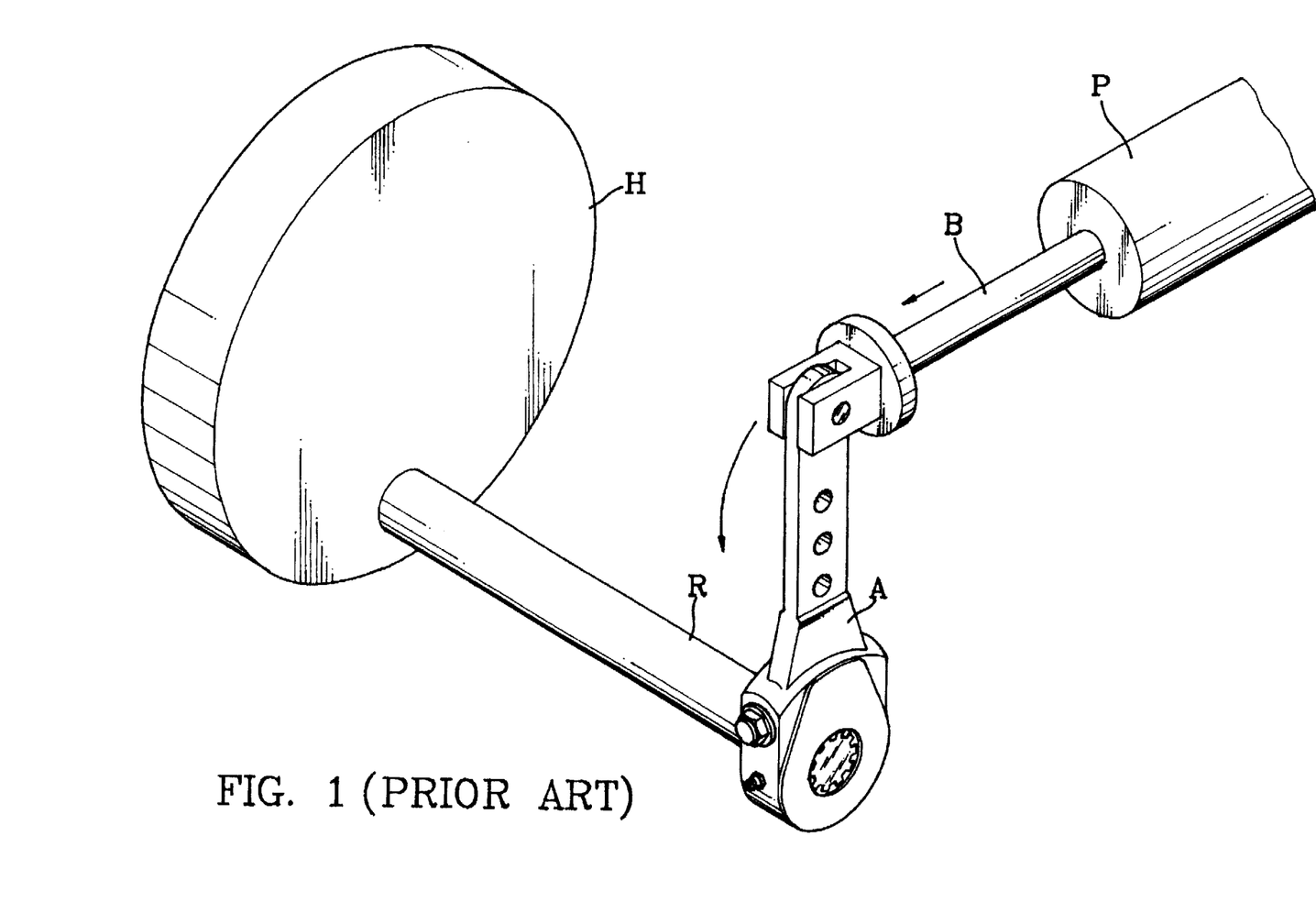
FIG. 1 is a perspective view of a conventional brake-adjusting structure.
Figure 2:
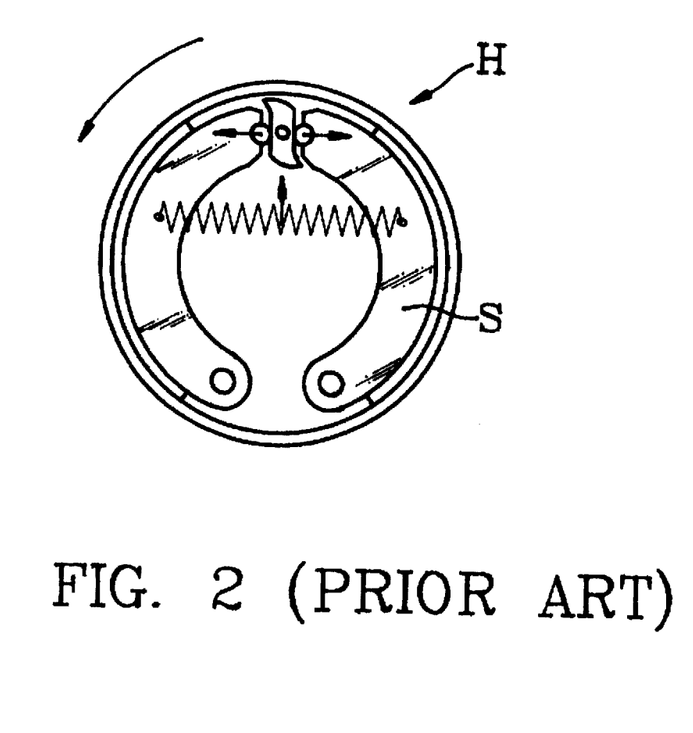
FIG. 2 is a perspective view of a conventional brake drum.

FIG. 1 is a perspective view of a brake-adjusting device of a trailer, in which the driving rod B of the brake pneumatic cylinder P can provide a braking function through the brake-adjusting device A and the brake dram H; the brake-adjusting device A enables the brake-shoe driving rod R to rotate so as to have the brake shoe S of the brake drum H produce a braking function (as shown in FIG. 2).

Figure 3:
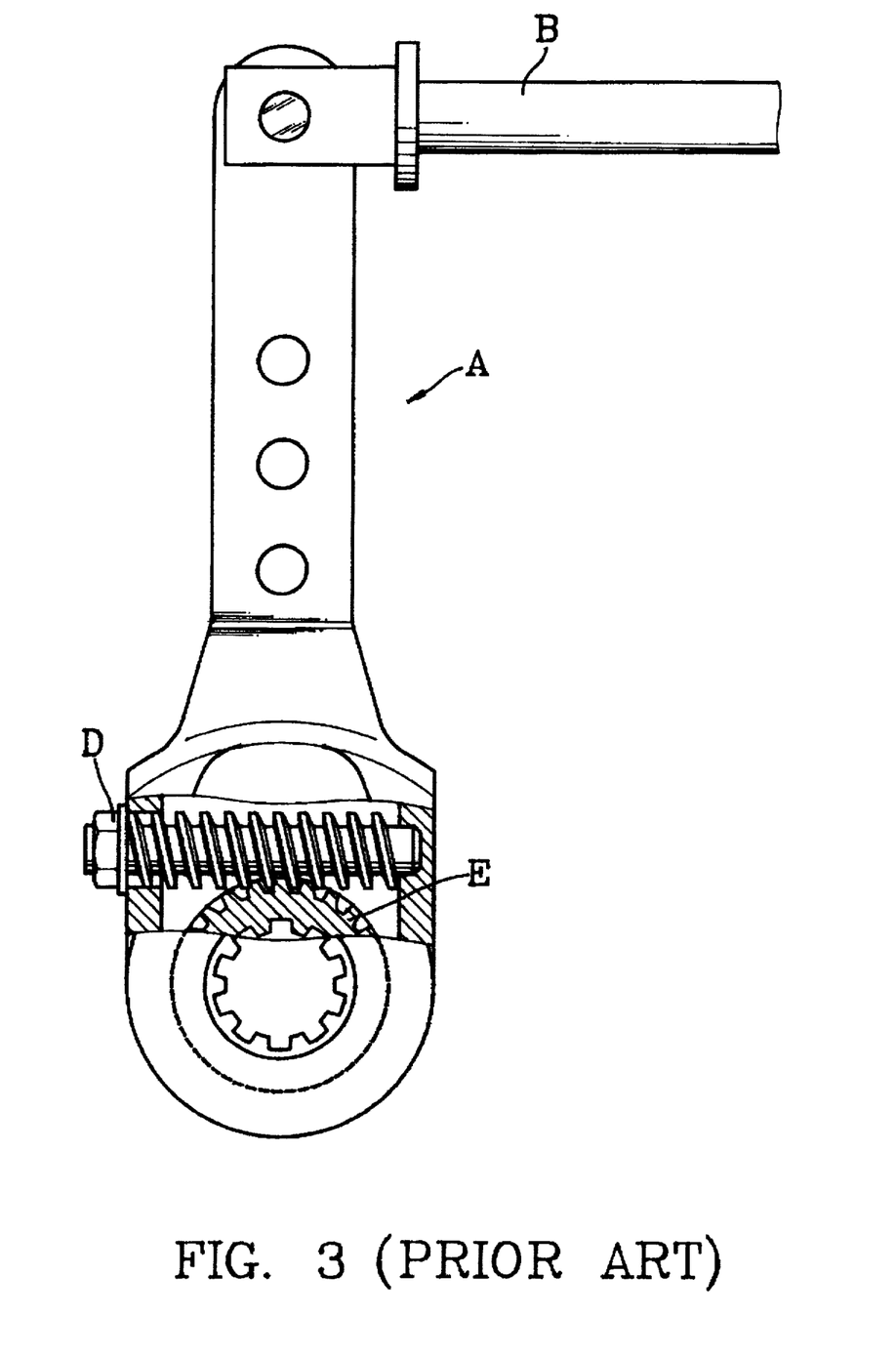
FIG. 3 is a fragmental section view of a conventional brake-adjusting structure.

Generally, the conventional brake-adjusting device (as shown in FIG. 3) has a transmission bush E and an adjusting screw rod D; the adjusting screw rod is used for adjusting the brake clearance. When adjusting screw rod D is rotated, the transmission bush E will be turned to adjust the brake clearance between the brake shoe and the brake drum so as to obtain a sensitive braking function; however, the conventional brake-adjusting device has drawbacks as follows:

(A). After long time use, the wearing-out brake shoe will cause the brake clearance between the brake shoe and the brake drum to become bigger, and therefore the adjusting screw rod D must be turned quite often so as to restore the original brake sensitively.

(B). The engagement between the adjusting screw rod and the transmission bush is not quite close because of the nut being subject to becoming loose after long time use, and then the brake sensitivity will be reduced.

Consequently, the applicant, in view of the drawbacks of the prior art, has carefully studied and developed a new brake-adjusting device, which has advantageous features as follows:

(1). It can adjust the brake clearance automatically.

(2). After a long time use, the mechanical parts would not become loose to reduce the brake sensitivity.

The prime object of the present invention is to provide a new brake-adjusting device, which can automatically adjust the brake clearance, and can maintain the original brake sensitivity after long time use.

SUMMARY OF THE INVENTION

The automatic brake-adjusting device according to the present invention comprises an outer case, a ratchet, a pawl, a pulling bar, a transmission assembly and an outer lid. The ratchet has a plurality of first ratchet teeth; the pawl has at least one second ratchet tooth to be engaged with the first ratchet teeth. The ratchet can turn freely in one direction; the rotation of the ratchet can cause the brake shoe to provide a braking function. When the pulling bar is driven with the brake pneumatic cylinder to turn in the braking direction, the ratchet can turn slightly in the free rotation direction thereof so as to have the brake shoe produce a braking function. When the driving force of the brake pneumatic cylinder is removed, the ratchet will slightly move backwards to release the braking friction. When the brake shoe is worn out to a given condition, the pulling bar enables the ratchet to move forwards at a tooth pitch in the free rotation direction so as to restore the brake clearance to the original condition.

The automatic brake-adjusting device of the present invention has advantageous feature as follows:

2

(1). It can adjust the brake clearance automatically.

(2). After a long time use, the mechanical parts would not become loose.

DETAILED DESCRIPTION

Figure 4:
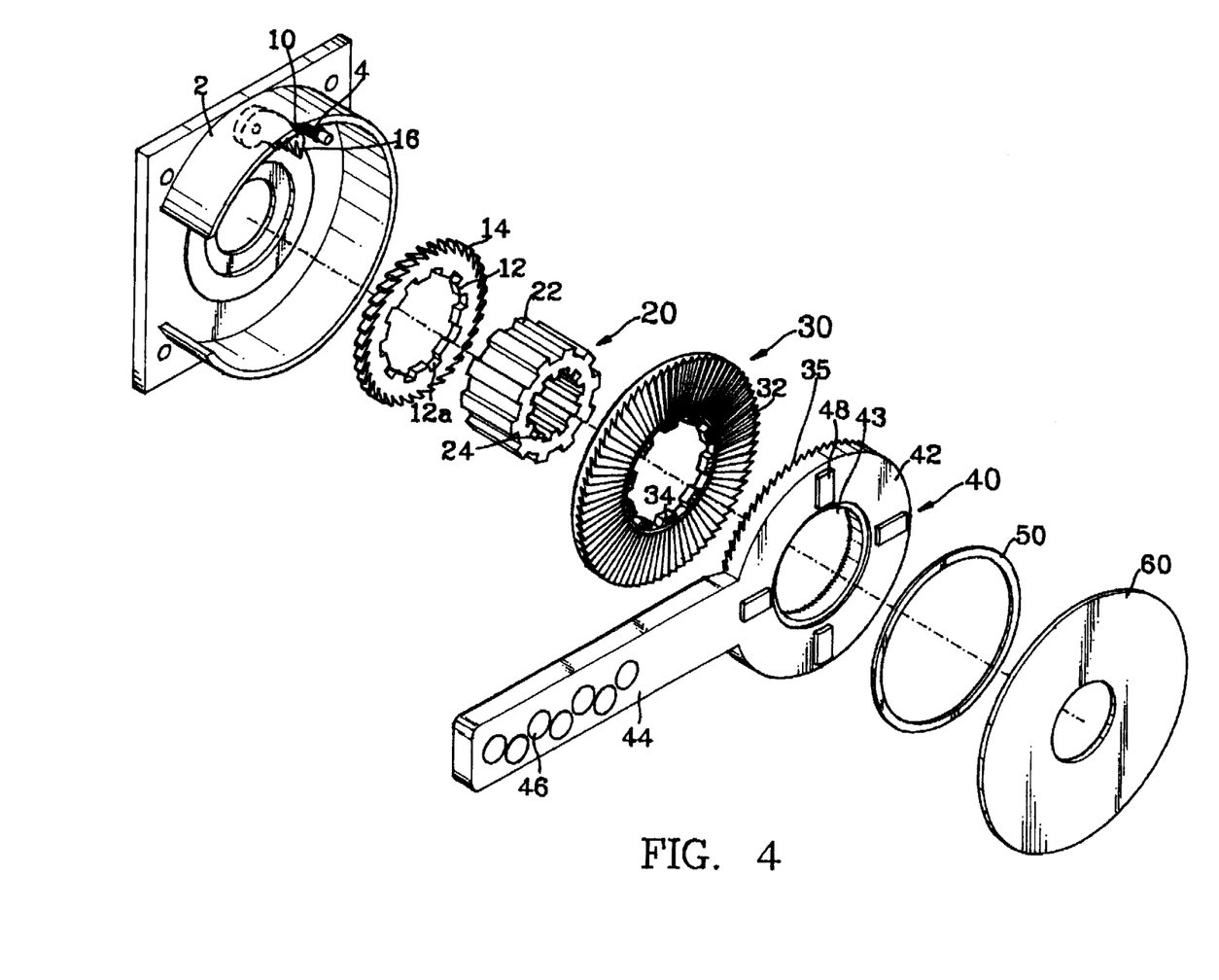
FIG. 4 is a disassembled view of an automatic brake-adjusting device according to the present invention.
Figure 7:
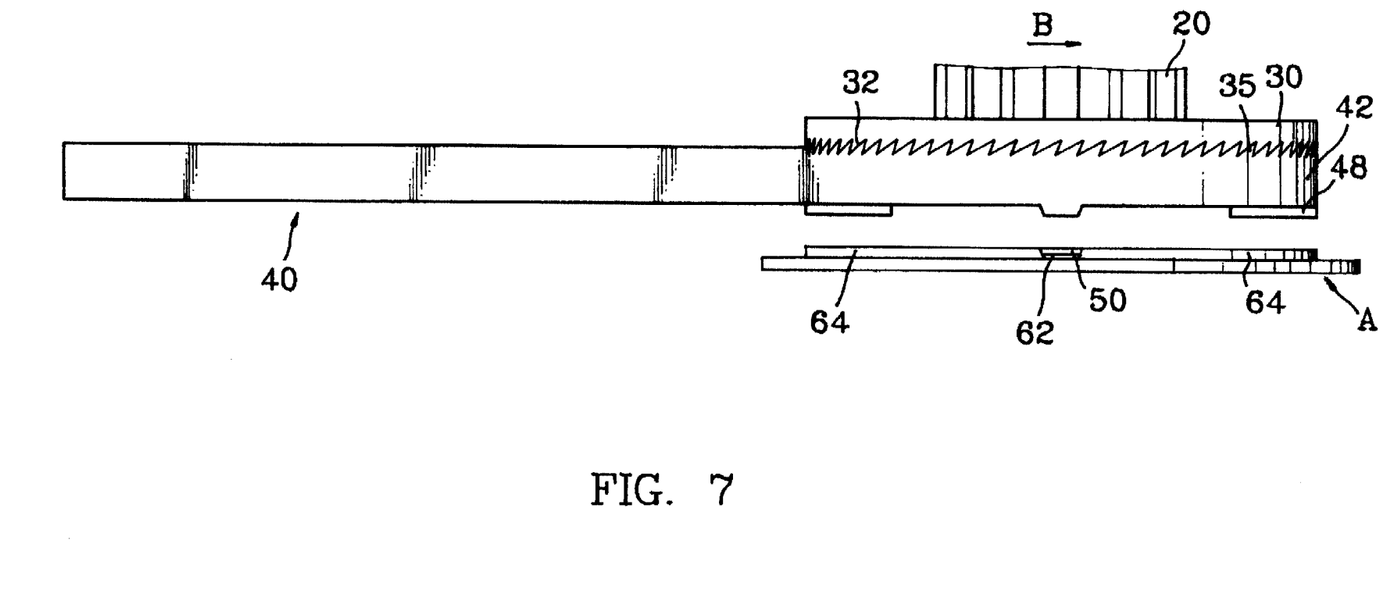
FIG. 7 is a side view of a pulling bar in the brake device according to the present invention.
Figure 10:
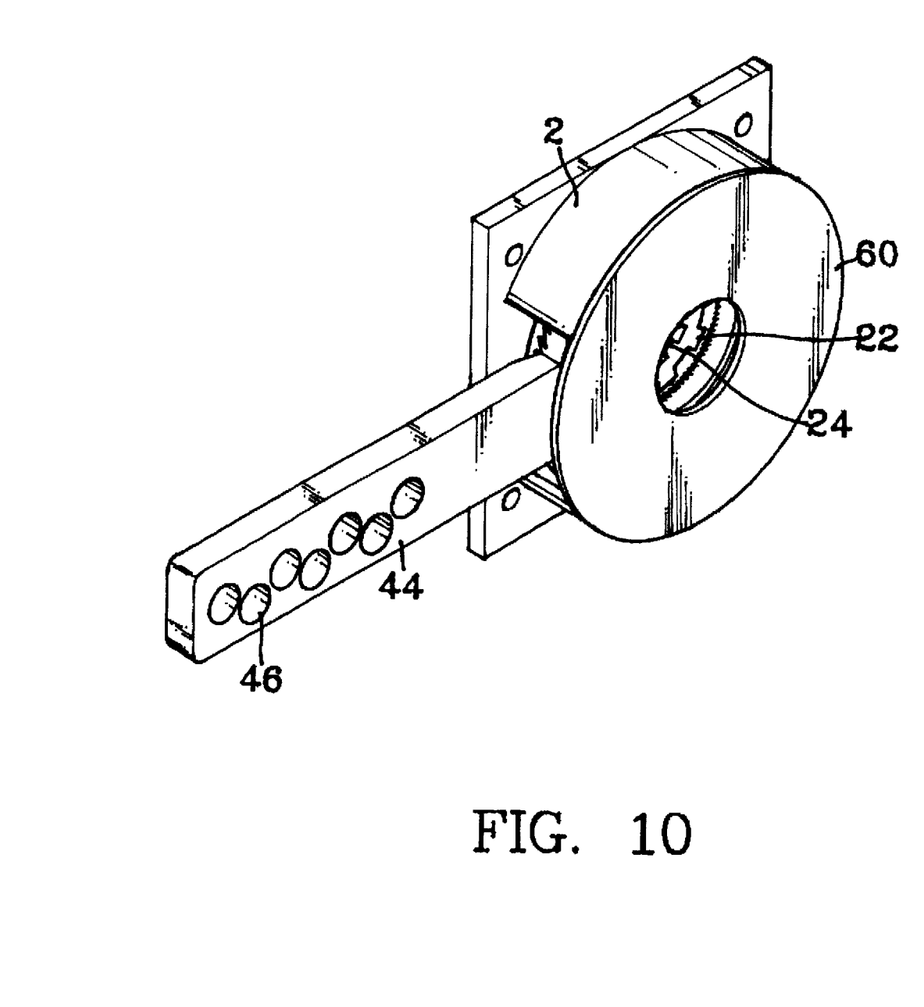
FIG. 10 is a perspective view of the automatic brake-adjusting device according to the present invention.

FIG. 10 is a perspective view of the automatic brake-adjusting device according to the present invention. FIG. 4 is a disassembled view of the present invention, which comprises an outer case 2, a ratchet 12, a pawl 10, a transmission bush 20, a transmission disk 30, a pulling bar 40, a ring spring 50, and an outer lid 60. The pawl 10 is pivotally mounted to the outer case 2; the ratchet 12 is furnished with a plurality of first ratchet teeth 14; the inner circle thereof has a first latch hole 12a. The pawl 10 is provided with a plurality of second ratchet teeth 16 to be engaged with the first ratchet teeth 14 so as to have the ratchet moved in one direction only (as shown with an arrow in FIG. 5). The rotation of the ratchet 12 can have the brake shoe provided a braking function. The pulling bar 40 includes an elongate bar 44 and a base part 42; the elongate bar extends out of the outer case. The base part is substantially a disk shaped member mounted in the outer case. The elongate bar has a plurality of fixing holes 46 for connecting a driving bar of a brake pneumatic cylinder. The center of the base part 42 has a round hole 43. One side of the base part is furnished with a plurality of salient blocks 48, while the other side thereof is furnished with a plurality of first disk teeth 35. A transmission bush 20 has latch teeth 22 on the outer surface thereof, and a second latch hole 24 on the inner surface thereof. The transmission disk 30 has a plurality of second disk teeth 32 on the outer surface thereof, and a third latch hole 34 thereof. The latch teeth 22 of the transmission buch 20 is fitted into the first latch hole 12a of the ratchet 12. The third latch hole 34 of the transmission disk 30 is to be mounted over the latch teeth 22 of the transmission bush 20. The first disk teeth 35 of the base part 42 are to be engaged with the second disk teeth 32 (as shown in FIG. 7) of the transmission disk 30; therefore, the pulling bar 40 can have the ratchet 12 moved in one direction (as shown with an arrow B in FIG. 7) by means of the transmission bush 20 and the transmission disk 30. The second latch hole 24 of the transmission bush 20 is connected with the brake-shoe driving rod so as to have the ratchet 12 control the brake shoe.

Referring to FIG. 4, an outer lid 60 according to the present invention is used for sealing the opening of the outer case 2 after the pans being mounted in the outer case 2. A ring spring 50 is used for pressing the pulling bar 40 mounted in the outer case 2 tightly and closely.

Figure 5:
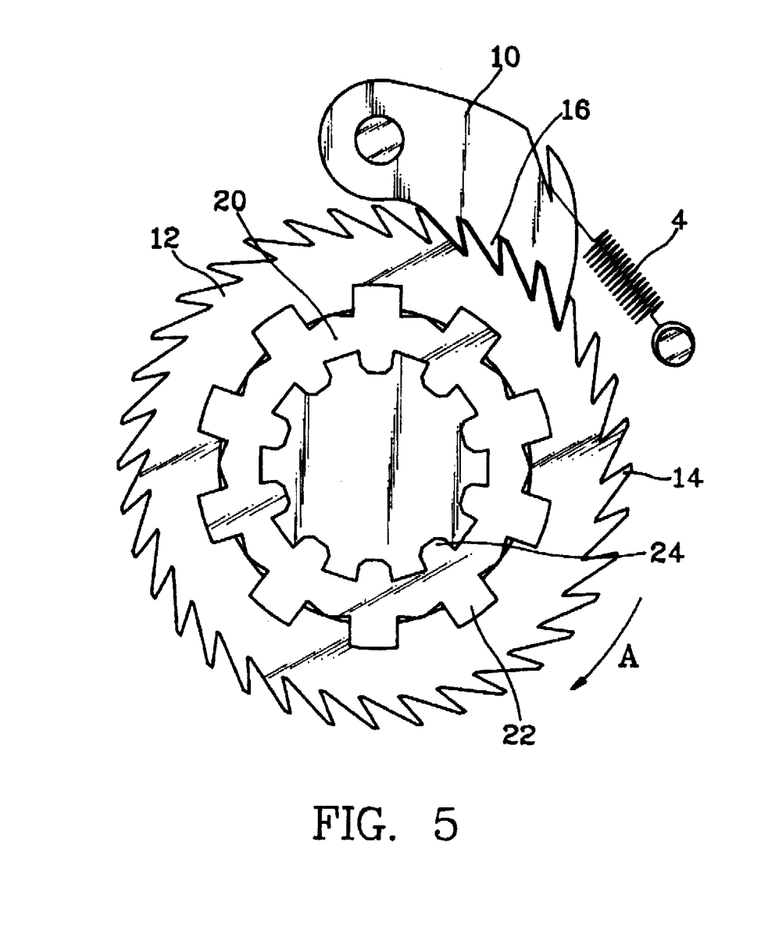
FIG. 5 is a sectional view of the ratchet in the present invention (when the brake pneumatic cylinder not operating).
Figure 6:
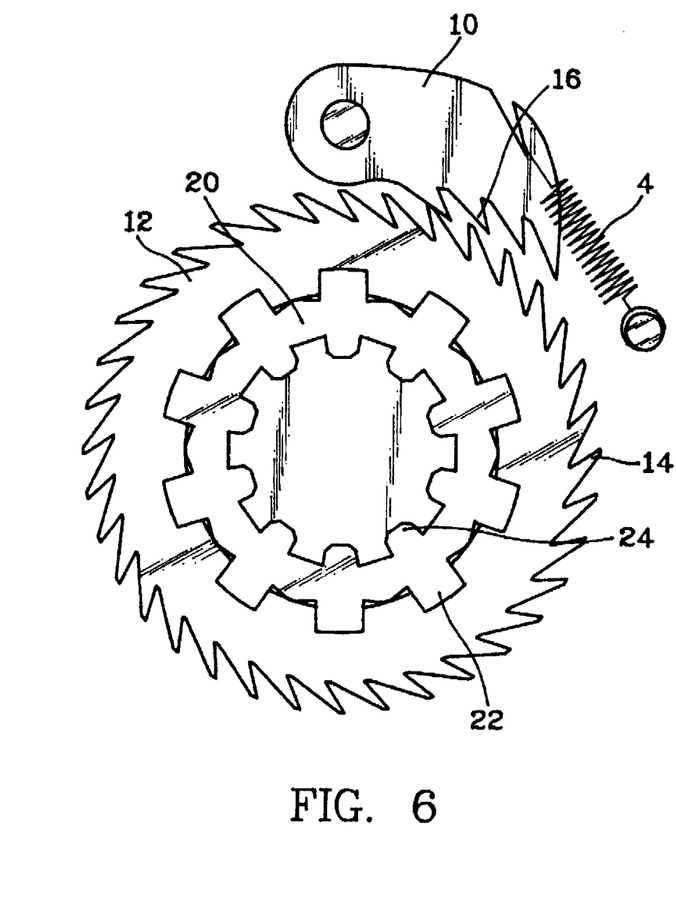
FIG. 6 is a sectional view of the ratchet in the present invention (when the brake pneumatic cylinder operating).

Referring to FIG. 5, it is a sectional view to show the operation of the ratchet (upon the brake pneumatic cylinder not operating). The ratchet 12 is furnished with a plurality of first ratchet teeth 14 to be engaged with the second ratchet teeth 16 of the pawl 10 so as to have the ratchet 12 to move one way only (as shown with the arrow A). After the brake shoe is worn out to a given condition, the brake clearance between the brake shoe and the brake drum will be increased; the ratchet 12 will move one tooth pitch forwards automatically as a result of the pulling rod of the brake being pulled so as to have the brake clearance restored to the original value. When the brake pneumatic cylinder drives the pulling bar 40 to turn, the ratchet 12 will turn slightly to have the brake shoe provide a braking function (as shown in FIG. 6). As soon as the driving force of the brake pneumatic cylinder is released, the ratchet 12 will turn backwards slightly so as to have the pawl 10 and the second ratchet teeth 16 engaged closely (as shown in FIG. 5)

Referring to FIG. 7, the transmission disk 30 has a plurality of second disk teeth 32, and the base part 42 has a plurality of first disk teeth 35; the teeth on the aforesaid two disks are all bevel teeth; when the two tooth disks are engaged together, the pulling bar can drive the transmission disk 30 to turn in one direction (as shown with the arrow therein); such feature enables the brake clearance of the brake drum to be adjusted manually. Such manual adjustment can simply be done by having the pulling rod turn in a direction as shown with an arrow B so as to cause the transmission disk 30 to turn. The turning of the transmission disk can cause the brake-shoe driving rod to turn, and the brake shoe is driven to move. As soon as the brake-shoe driving rod is driven to a condition of braking, release the pulling bar, and then the pulling bar will turn backwards slightly (less than a tooth pitch, and a brake function will be provided within such a pitch).

Figure 8:
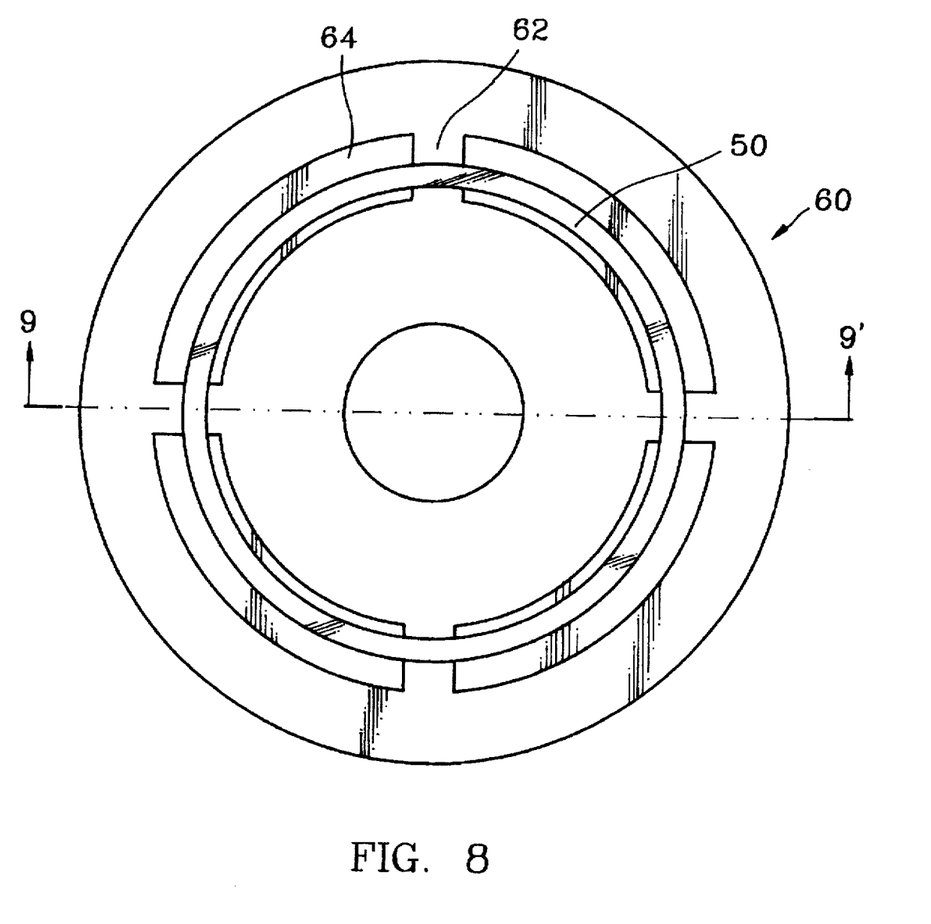
FIG. 8 is a top view of the outer lid of the device according to the present invention.
Figure 9:
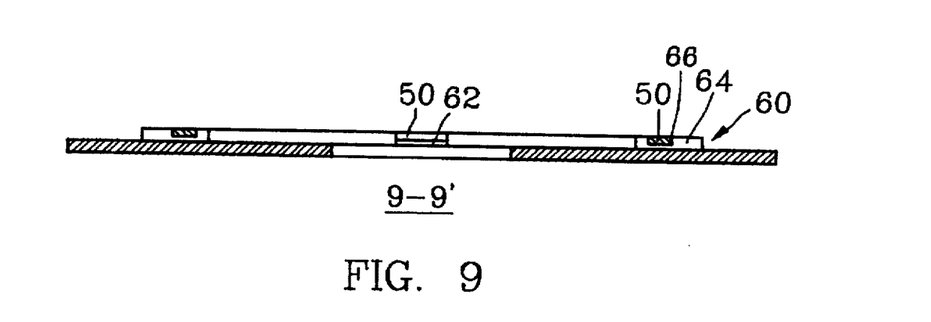
FIG. 9 is a sectional view along line A—A of FIG. 8.

Referring to FIGS. 8 and 9, the outer lid 60 has a plurality of arch-shaped ridges 64; between two such arch-shaped ridges, there is a groove 62 to be engaged with a salient block 48 on the pulling bar 40 (as shown in FIG. 5). In order to provide a compactness of the automatic brake-adjusting device as mentioned above, there is a ring spring 50 mounted in an arch-shaped groove 66 on the arch-shaped ridges 64.

Further, the elongate bar 44 of the pulling bar 40 is provided with a plurality of fixing holes 46 so as to fit different height of a brake pneumatic cylinder.

Moreover, the automatic brake-adjusting device according to the present invention may be installed with a sensing device; when the brake shoe is worn out to a condition necessary to be replaced, the sensing device will worn the driver to replace the brake shoe. The sensing device includes a member to be sensed and a sensor. The member to be sensed is mounted on a position around the transmission disk 30; the sensor can detect the member to be sensed through a hole on the outer case 2. When the member to be sensed moved near the sensor upon the transmission disk 30 turning, the sensor will send out a signal to worn the drive.

The aforesaid member to be sensed and the sensor can be two metal pieces; when the two metal pieces are in contact with each other, an electric power can be tamed on to light up an alarm lamp to warn a driver that the brake shoe should be replaced. The aforesaid sensing device may be a magnetic sensing device.

Summing up the aforesaid description, the present invention has features as follows:

(1). The brake clearance can be adjusted automatically.
(2). The parts of the device would not become loose after long time use.

The aforesaid description is merely used to construe the embodiment according to the present invention in terms of objects and functions; any change thereto in accordance with the concept of the present invention to produce a function and object by a person, who is skilled in the art, will be deemed within the scope of the claims of the present invention.

I claim:

1. An automatic brake-adjusting device for adjusting clearance between brake drum and a brake shoe automatically, and said device comprising:

an outer case with an opening;

(b) a ratchet assembly mounted in said outer case, and including a ratchet and a pawl; said ratchet having a plurality of first ratchet teeth; said pawl having at least a second ratchet tooth be engaged with said first ratchet teeth so as to cause said ratchet to be moved in one direction freely; rotation of said ratchet being coupled to said brake drum and to said brake shoe so as to provide a brake function:

(c) a pulling bar including a base part and an elongated bar; said base part mounted in said outer case; said elongated bar extending out of said outer case, and being connected with a pneumatic brake cylinder;

(d) means for transmitting the movement of said pulling bar to the movement of said ratchet;

(e) an outer lid for closing said opening of said outer case;

(f) wherein said ratchet has a first latch hole in a center thereof; said base part of said pulling bar having a round hole, and surface of said base part furnished with a plurality of first disk teeth; said transmission device including a transmission bush and a transmission disk; outer surface of said transmission bush having latch teeth; inner surface of said transmission bush furnished with a second latch hole, which being coupled with a brake-shoe driving rod to drive said brake shoe; said transmission disk having a third latch hole to be engaged with said latch teeth on said transmission bush; said latch teeth of said transmission bush coupled with said first latch hole; surface of said transmission disk having a second disk teeth to be engaged with said first disk teeth of said pulling bar so as to have said pulling bar drive said ratchet to move in free rotation direction whereby when said brake shoe being worn out to a predetermined condition, said ratchet moving forward at a tooth pitch in free rotating direction so as to cause said brake shoe to be restored, to its original brake clearance.

2. An automatic brake-adjusting device as claimed in claim 1, wherein other side of said base part of said pulling bar has a plurality of salient blocks arranged in equal space one another; surface of said outer lid furnished with a plurality of arch-shaped ridges; between two said arch-shaped ridges, a groove being furnished to be engaged with a said salient block of said pulling bar; said arch-shaped flange having an arch-shaped groove for receiving a ring spring so as to have said outer lid maintain said pulling bar in said outer case closely.

3. An automatic brake-adjusting device as claimed in claim 1, wherein said elongated bar of said pulling bar has a plurality of fixing holes to be connected with a driving rod of said pneumatic brake cylinder so as to enable said automatic brake-adjusting device to adapt to different pneumatic brake cylinders having different height.

4. An automatic brake-adjusting device able to adjust a brake clearance between a brake drum and a brake shoe automatically, and said device comprising:

(a) an outer case with an opening:

(b) a ratchet assembly mounted in said outer case, and including a ratchet and a pawl; said ratchet having a plurality of first ratchet teeth and a first latch hole in center thereof; said pawl having at least a second ratchet tooth to be engaged with said first ratchet teeth so as to have said ratchet turn in one direction freely;

(c) a pulling bar including a base part and an elongate bar; said base part with a round hole mounted in said outer case; and surface of said base part having a plurality of first disk teeth; said elongate bar having a plurality of fixing holes, and extended out of said outer case and connected with a brake pneumatic cylinder;

(d) a transmission bush including a plurality of latch teeth on outer surface thereof, and a second latch hole on inner surface thereof; said second latch hole to be engaged with a brake-shoe driving rod so as to drive said brake shoe; said latch teeth to be engaged with said first latch hole;

(e) a transmission disk having a said third latch hole to be engaged with said latch teeth of said transmission bush; surface of said transmission disk having a plurality of second disk teeth to be engaged with a plurality of first disk teeth of said pulling bar so as to have said pulling bar drive said ratchet to turn in free rotation direction only;

(f) an outer lid for closing said opening of said outer case;

as soon as said brake shoe being worn out to a given condition, said ratchet able to move forward automatically along a direction at a tooth pitch so as to have said brake shoe restore to its original brake clearance.

5. An automatic brake-adjusting device as claimed in claim 4, wherein other side of said base part of said pulling bar has a plurality of salient blocks arranged in equal space one another; surface of said outer lid furnished with a plurality of arch-shaped ridges, and a groove furnished between two said arch-shaped ridges to be engaged with said salient blocks of said pulling bar; each said arch-shaped flange having an arch-shaped groove for receiving a ring spring as to have said outer lid maintain said pulling bar in said outer lid closely.

* * * * *